Oct. 20, 1931.    C. A. FRY ET AL    1,828,462
CERAMIC BLOCK CUTTING APPARATUS AND PROCESS
Filed Nov. 1, 1930    4 Sheets-Sheet 4

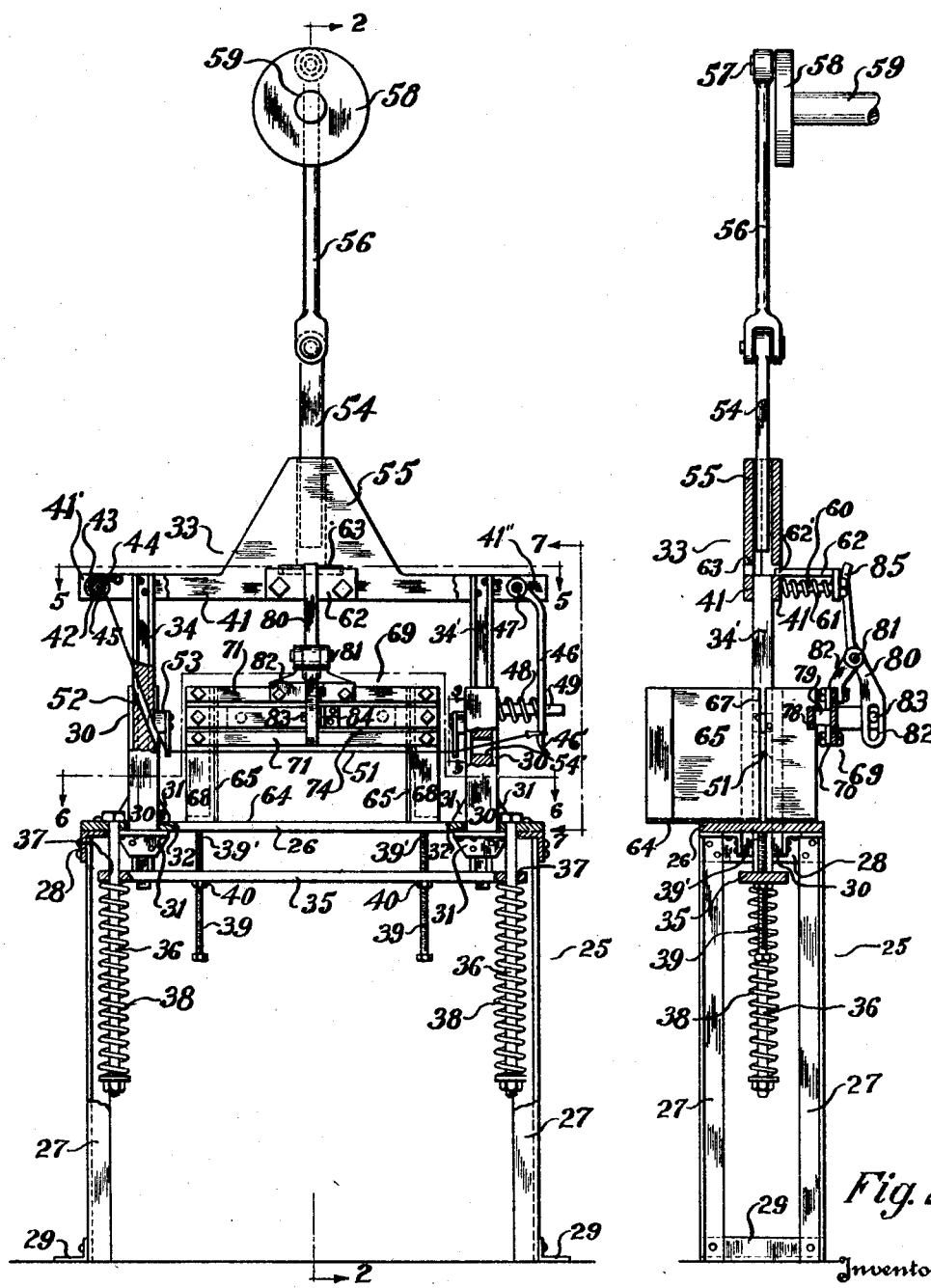

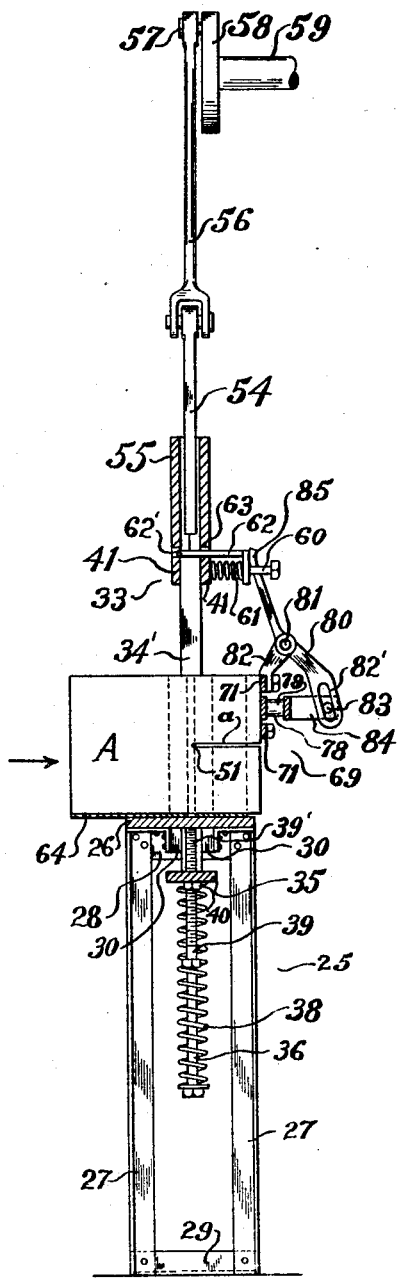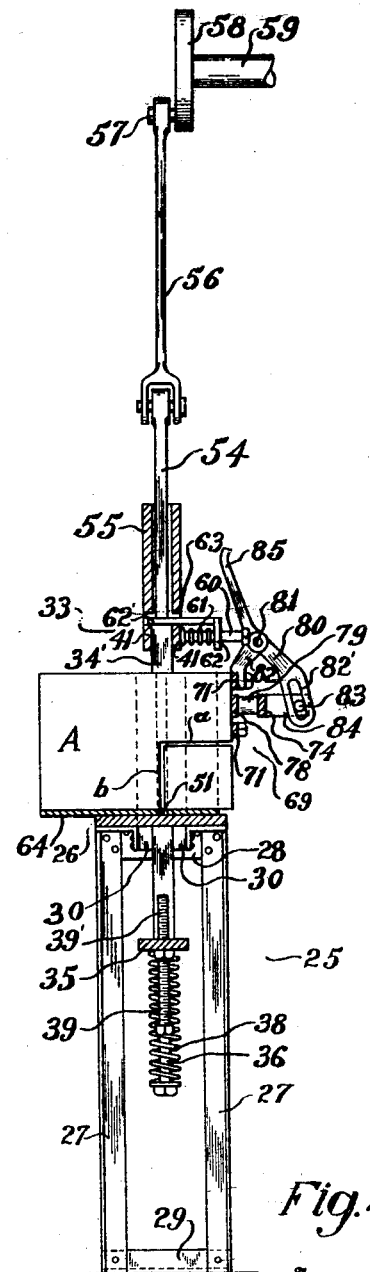

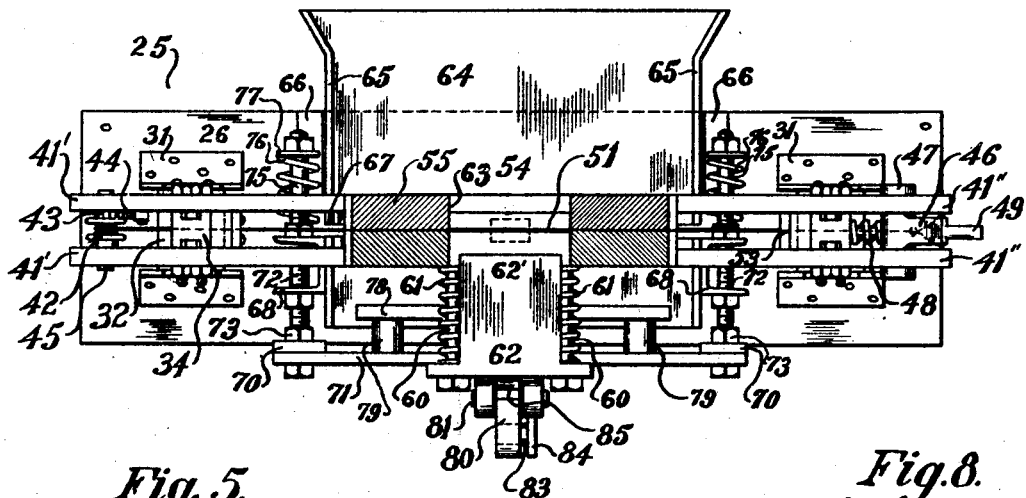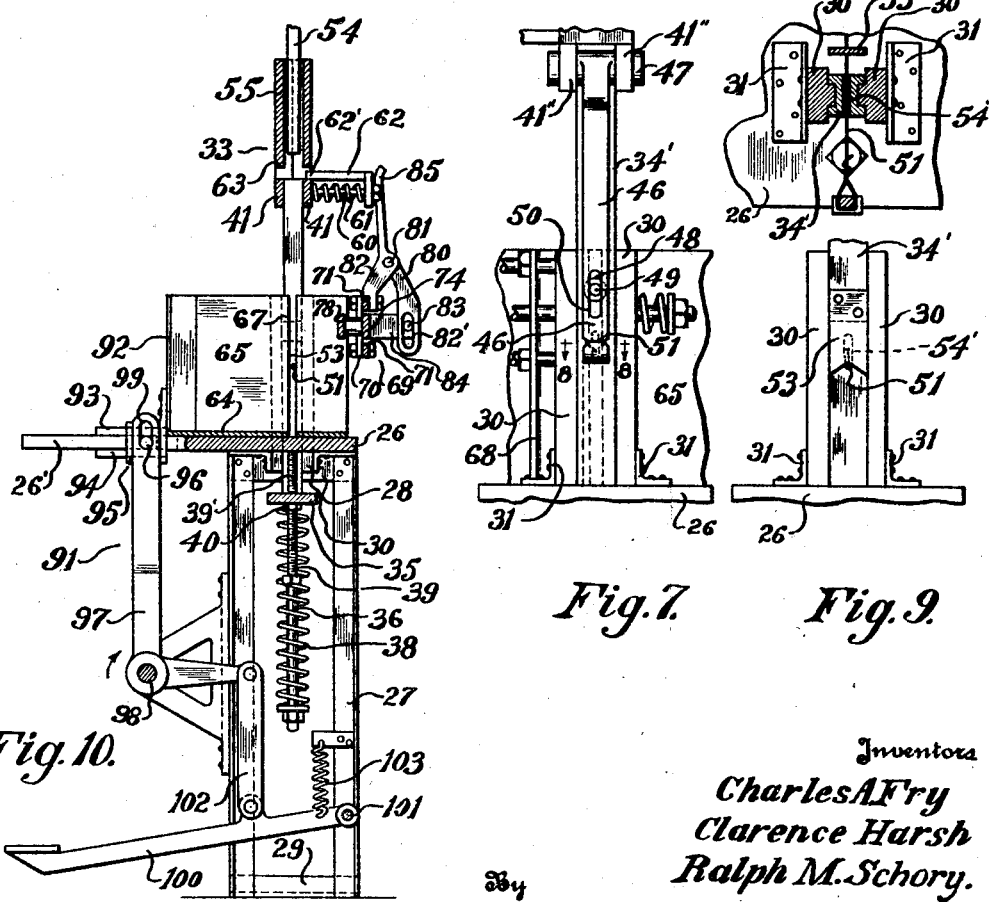

Inventors
Charles A. Fry.
Clarence Harsh
Ralph M. Schory.
By Fraser and Bishop Attorneys Patented Oct. 20, 1931

1,828,462

UNITED STATES PATENT OFFICE

CHARLES A. FRY, CLARENCE HARSH, AND RALPH M. SCHORY, OF MINERVA, OHIO, ASSIGNORS TO THE METROPOLITAN PAVING BRICK COMPANY, OF CANTON, OHIO, A CORPORATION OF OHIO

CERAMIC BLOCK CUTTING APPARATUS AND PROCESS

Application filed November 1, 1930. Serial No. 492,784.

The invention relates to apparatus for making ceramic products, and more particularly to cutting apparatus or machinery for use in making an angular, irregular, or rabbeted corner or cut of predetermined length and depth in ceramic ware such as hollow-block, brick, or tile and the like.

Hollow-blocks are frequently used in constructing a back-up wall for a brick wall, and for this purpose the blocks must be provided with notches or rabbeted corners so that the same will interlock with the brick header courses, in order to tie the brick wall and hollow-block or tile wall together.

Hollow-blocks may readily be formed with rabbeted corners which extend parallel with the block cells, on the usual clay column forming machine; but such hollow-block construction requires the block cells to be horizontally disposed when the same are used as header back-up blocks for brick walls.

It is preferable, for drainage and other purposes, to locate the block cells in a vertical position when hollow-blocks are used as header back-up blocks for brick walls. In such cases, the rabbeted corners must be located at right angles with respect to the block cells, and such rabbeted corners cannot be formed on the usual clay column forming machines. In the past, when it has been necessary to provide such rabbeted corners, the same has been accomplished by cutting out by hand the corners of green hollow-blocks produced by the usual clay-forming machine.

It is therefore an object of the present invention to provide a cutting machine for producing a rabbeted corner in previously formed ceramic products.

A further object of the present invention is to greatly reduce the time, labor and expense required for providing rabbeted corners in previously formed ceramic products, as compared with present hand methods.

Furthermore, it is an object of the present invention to provide a machine for cutting rabbeted corners in previously formed ceramic ware which may be readily, quickly and easily adjusted to make any length, depth and angularity of rabbeted corner.

With present hand methods of providing rabbeted corners in ceramic ware, the resulting blocks are not uniform, and the rabbeted corners thereof are irregular and imperfect.

Accordingly, it is a further object of the present invention to provide a machine for producing uniformly perfect rabbeted corners or cut-outs in previously formed ceramic ware.

And finally, it is an object of the present invention to provide ceramic block cutting apparatus for carrying out all of the above objects, which has a simple design and inexpensive construction, and which may be readily, quickly and easily adjusted and operated by one person for the quantity production of ceramic ware having rabbeted corners.

These and other objects may be attained by providing ceramic block cutting apparatus, preferred embodiments of which are shown in the accompanying drawings and described in detail, and which may be stated in general terms as including a table, a ceramic block guideway, a frame mounted for reciprocating movement with respect to the table, a cutting wire carried by the frame, yielding means for normally maintaining the frame in raised position to normally hold the wire at a predetermined location spaced from the table, means for adjusting the normal raised position of the frame for adjusting the normal location of the wire with respect to the table, preferably continuously moving means for reciprocating the frame, releasable clutch or latch means for engaging the moving means operatively with respect to the frame for reciprocating the frame to move the wire toward the table, trip means actuated by a ceramic block moved substantially horizontally of the wire for operating the clutch, and means for adjusting the position of the trip with respect to the wire.

In the drawings:

Figure 1 is a front elevation of the improved apparatus looking toward the front end thereof with certain parts broken away and in section for the purpose of illustration;

Fig. 2 is a vertical section taken on the line 2—2, Fig. 1;

Fig. 3 is a fragmentary section similar to Fig. 2 showing the position of the parts just after a block has been horizontally cut or slit by the cutting wire;

Fig. 4 is a fragmentary section similar to Figs. 2 and 3 showing the position of the parts after a vertical cut or slit has been made in a block by the cutting wire;

Fig. 5 is a plan section taken on the line 5—5, Fig. 1;

Fig. 7 is a fragmentary side elevation of the improved apparatus looking in the direction of the arrows 7—7, Fig. 1;

Fig. 8 is a sectional view taken on the line 8—8, Fig. 7;

Fig. 9 is an elevation of the cutting wire supports looking in the direction of the arrows 9—9, Fig. 1;

Fig. 10 is a vertical sectional view similar to Fig. 2 of a modified form of apparatus including pusher mechanism for the blocks being rabbeted;

Figure 17:
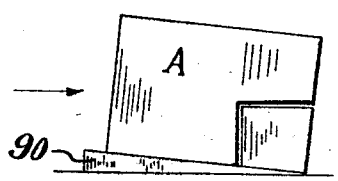
Figure 18:
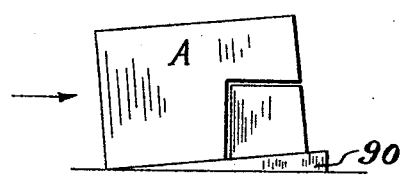

Figs. 13, 14, 15 and 16 diagrammatically illustrate blocks having corner notches of different lengths and depths cut therein by the improved apparatus; and Fig. 17 to 22, inclusive, diagrammatically illustrate various forms of notched or rabbeted corners which may be cut in hollow-blocks by the improved apparatus by utilizing the special base block shown in Figs. 17 and 18;

Similar numerals refer to similar parts throughout the drawings.

The improved ceramic block cutting apparatus indicated generally at 25, preferably includes a table 26, mounted on legs 27, by angles 28, the floor engaging ends of the legs being joined together by angles 29.

A plurality of sets of spaced rabbeted guide bars 30, are mounted on the table 26, by angle brackets 31, and extend through apertures 32 provided in the table 26. A wire holder and cutter frame generally indicated at 33 is mounted for reciprocating movement with respect to the table 26 and includes preferably H-sectioned bar members 34 and 34′ slidably mounted between the spaced rabbeted guide bars 30.

The lower ends of the slidable bar members 34, 34′ are connected together by a lower cross bar 35. Spring mounting rods 36 extend downward from the table 26 through apertures 37, provided in the ends of the lower cross bar 35, and have compression springs 28 mounted thereon, reacting against the lower cross bar 35 to normally urge the same upwards.

Adjusting screws 39 are threaded through the lower cross bar 35 and maintained in any desired adjusted position by lock nuts 40. The upper ends 39′ of the adjusting screws 39 engage the lower surface of the table 26 for limiting the upward movement of the bar members 34, 34′ by the action of the springs 38. By adjustment of the screws 39, the upward limit of movement of the bar members 34, 34′ may be changed.

The upper ends of the bar members 34, 34′ are connected together by a plurality of upper cross bars 41 which complete the formation of the frame 33. A cutting wire spool 42, provided with a ratchet 43, and pawl 44, is journaled at 45, between the outer ends 41′, of the upper cross bars 41.

The cutting wire tensioning lever 46, is pivoted at 47 between the other outer ends 41″ of the upper cross bar 41, and is normally urged outwardly by the compression spring 48, carried by a stub rod 49 mounted on the bar member 34′ and extending through an elongated aperture 50 provided in the tensioning lever 46.

A cutting wire 51 has one end wrapped around the spool 42, then passes through an aperture 52 provided in the bar member 34. The wire 51 is then engaged on the V-notched cutting wire supports 53 mounted on the bar members 34 and 34′, from whence it passes through an aperture 54′ provided in the bar member 34′ and has its other end looped over the hook end 46′ of the cutting wire tensioning lever 46.

The slack in the cutting wire may be taken up by rotating the spool 42 and setting the pawl 44, whereby the cutting wire 51 will be stretched taut between its supports 53, by the action of the spring pressed tensioning lever 46.

A plunger bar or piston 54 is slidably mounted in the guide block 55 carried by the upper cross bars 41, and is normally continuously reciprocated by the connecting rod 56, mounted on the crank pin 57, carried by the disk 58, provided on the shaft 59, which is continuously rotated by any suitable source of power not shown.

The lower end of the plunger bar or piston 54 is normally free to reciprocate between the spaced upper cross bars 41 as shown in Fig. 2 of the drawings.

A plurality of stub rods 60 project outwardly from one of the upper cross bars 41 for mounting compression springs 61 reacting outwardly against the downturned flange of the L-shaped latch or clutch member 62 also mounted on the stub rods 60. The inner end 62' of the clutch member 62 is slidably mounted in the cross guide 63 provided in the guide block 55.

Figure 6:
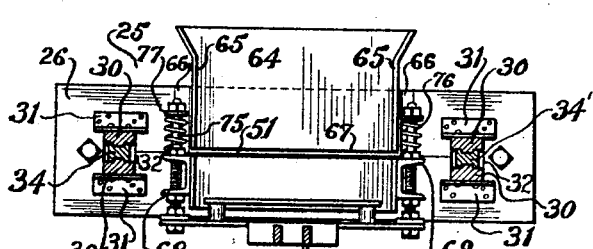
Fig. 6 is a plan section taken on the line 6—6, Fig. 1.

A block guideway 64, having upright flanges 65, is mounted by angles 66 on the table 26; and the guideway 64 and flanges 65 thereof extend crosswise of the cutting wire and are vertically severed at 67, as shown in Figs. 2 and 6, to permit the cutting wire 51 to move toward and away from the table 26 freely of the guideway.

Channel members 68 extend upwardly from the table 26, to provide a mounting for a stop frame indicated generally at 69. The stop frame 69 is composed of upright bars 70 and cross bars 71 adjustably mounted on the upright channels 68 by elongated bolts 72 and nuts 73. Adjustment of the bolts 72 and nuts 73 permits the stop frame cross bars 71 to be adjusted toward or away from the cutting wire 51.

A trip frame cross bar 74 is provided with laterally extending rods 75, slidably mounted in apertures provided in the upright bars 70 and channel members 68. Compression springs 76 are mounted on the rods 75, reacting between the upright channels 68 and shoulders 77, to normally urge the trip frame toward and in contact with the stop frame upright bars 70. A trip bar 78 is mounted on bosses 79, carried by the trip frame cross bar 74, in spaced relation rearwardly of the cross bar 74.

A clutch operating trip lever 80 is pivotally mounted at 81 on a bracket 82 carried by the upper stop frame cross bar 71. One end of the lever 80 is provided with an elongated slot 82', engaging a pin 83, provided on the ear 84 projecting outwardly from and carried by the trip frame cross bar 74. When the trip lever 80 is in normal position, its upper end 85 is located in a position slightly spaced away from the downturned flange of the L-shaped latch or clutch member 62, as shown in Fig. 2.

The operation of the apparatus for cutting rabbeted corners in green hollow-blocks produced by the usual clay forming machine is as follows:

A green hollow-block indicated at A is pushed into the guideway 64—65 in the direction of the arrow shown in Fig. 3. The front end of the block A strikes the cutting wire 51 and moves past the same in one direction so that the cutting wire severs a portion of the block by cutting a longitudinally extending cross slit $a$ in the forward portion of the block until movement of the block ceases when it has reached the position shown in Fig. 3.

Meanwhile, the upper portion of the front end of the block after moving past the cutting member contacts with the trip bar 78 which is normally in the position shown in Fig. 2 of the drawings, and further movement of the block moves the trip bar 78 against the tension of the springs 76, to the position shown in Fig. 3 of the drawings, when further forward movement of the block A is stopped by contact of the front end of the block with the stop frame cross bars 71.

At the same time, the pin 83 carried by the ear 84 of the trip frame cross bar 74, has been moved outwardly to actuate the trip operating lever 80 about its pivot point 81 so that its upper end 85 contacts with the downturned flange of the L-shaped latch or clutch member 62 to press the latch or clutch member 62 inwardly in its cross guide 63, against the tension of the spring 61, to interpose the inner end of the latch or clutch member 62 in the path of the continuously reciprocating plunger bar or piston 54, so that all of the parts instantaneously assume the position shown in Fig. 3 of the drawings.

The next downward reciprocation of the piston 54 engages the latch member 62 carried by the wire holder and cutter frame 33 to move the frame 33 downward, so that the cutting wire 51 carried thereby is moved downwardly toward the table 26 from its normal stationary position until it just contacts with the table, thereby cutting a cross slit $b$ laterally of the block A in another direction with respect to the slit $a$ as shown in Fig. 4 of the drawings.

After the piston 54 has just completed a downward reciprocation, the various parts are in position shown in Fig. 4 of the drawings.

During upward movement of the piston 54, the springs 38 move the cutter frame 33 back to its normal stationary position shown in Figs. 1 and 2 of the drawings, and at the same time the block A, which has had a rabbeted corner notched or cut out provided therein, is removed from the table 26 and guideway 64—65, thereby releasing the trip bar 78 so that the trip springs 76 move the trip frame and trip lever 80 back to the position shown in Figs. 1 and 2 to release the latch or clutch member 62.

The springs 61 move the latch member 62 to the position shown in Figs. 1 and 2 so that further reciprocation of the piston 54 will not move the cutter frame downward, until another block A has been introduced in the guideway 64—65 and actuated the clutch trip mechanism.

Figure 11:
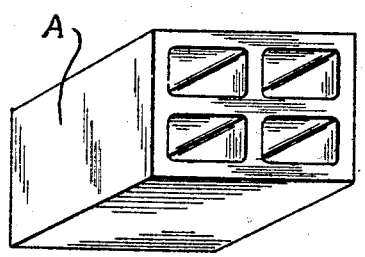
Fig. 11 is a perspective view of a green hollow-block before being operated on by the improved apparatus.
Figure 12:
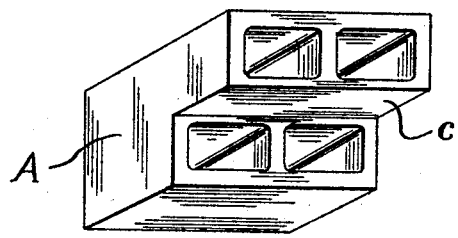
Fig. 12 is a prespective view of a green hollow-block after having had its corner rabbeted by operation of the improved apparatus.
Figure 13:
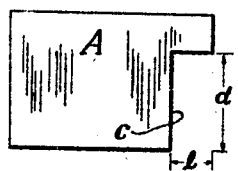
Figure 14:
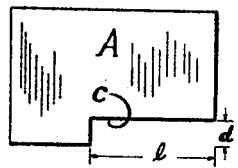
Figure 15:
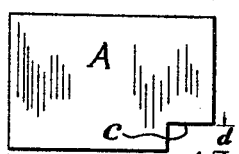
Figure 16:
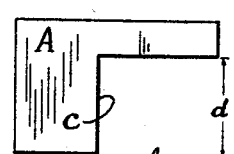

A green hollow-block A having a usual shape is shown in Fig. 11 before being operated on in the cutting apparatus, while the same block A is shown in Fig. 12 after having been notched in the cutting apparatus to form a rabbeted corner $c$ therein.

Various sizes of rabbeted corners $c$ may be cut in hollow-blocks A, as shown in Figs. 13 to 16, inclusive, by adjusting the bolts 72 and nuts 73 to vary the distance between the stop frame cross bars 71 and the cutting wire 51, for varying the lengths $l$ of the notches $c$; and by adjusting the screws 39 and lock nuts 40 to vary the normal stationary position of the cutting wire 51 with respect to the table 26, for varying the depths $d$ of the rabbeted corners $c$.

It may be desirable to form rabbeted corners in ceramic blocks having one or more faces which are not parallel with or perpendicular to the faces of the block. This may be accomplished by providing a tapered base plate 90 on which a block A is placed before being pushed into the guideway 64—65 of the cutting apparatus, as shown diagrammatically in Figs. 17 and 18.

Figure 19:
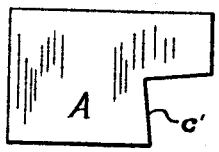

When the base plate 90 is used in the position shown in Fig. 17 of the drawings, a rabbeted corner $c'$, such as shown diagrammatically in Fig. 19, is produced having faces neither of which are parallel with any faces of the block A.

Figure 20:
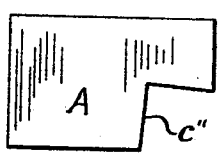

When the base plate 90 is used in the position shown diagrammatically in Fig. 18 of the drawings, the rabbeted corner such as shown at $c''$ in Fig. 20 is produced in the block A.

Figure 21:
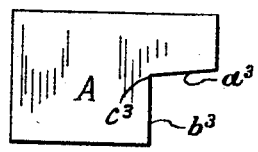
Figure 22:
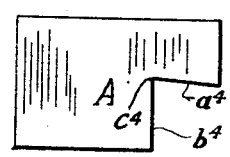

It may sometimes be desirable to provide rabbeted corners such as shown at $c3$ or $c4$, in Figs. 21 and 22 of the drawings, in which case, the base plate 90 may be utilized while the faces $a3$ or $a4$ are made angular with respect to the lower face of the block. The base plate 90 is then removed for making transverse faces $b3$ or $b4$ perpendicular to the lower face of the block.

In the modified form of apparatus shown in Fig. 10, block pusher mechanism indicated generally at 91 is provided which includes an L-shaped pusher cradle 92 on which the block A is placed. The cradle 92 is slidably mounted between flanges 93 and 94 on the table extension 26'. Channel shaped clips 95 are provided connecting the edge portions of the flanges 93—94 together, and the clips 95 have pintles 96 projecting outwardly therefrom.

Bell cranks 97, pivotally mounted at 98, are operatively connected by their elongated slots 99 with the pintles 96. The bell cranks may be rotated about their pivot points 98 in the direction shown by the arrow to push the cradle 92 toward the cutting wire 51, by depressing the foot lever 100, pivoted at 101, and connected by a link 102 with the bell cranks 97.

A spring 103 may be provided for raising the foot lever 100 to withdraw the cradle 92 from its depressed position shown in Fig. 10 of the drawings.

Accordingly, a simplified apparatus is provided for readily, quickly and easily cutting rabbeted corners of any desired length, depth and angularity in ceramic blocks such as hollow-block, brick, tile and the like.

Broadly, these rabbeted corners are formed by maintaining the cutting wire stationary and moving a block against the cutting wire, and then by maintaining the block stationary and moving the cutting wire through the block.

We claim:

1. The method of forming rabbeted corners and the like in ceramic blocks and the like by the use of a cutting member, which includes maintaining the cutting member stationary and moving a portion of a block past the cutting member so that the cutting member severs a portion of the block, then maintaining the block stationary and moving the cutting member through the block.

2. Apparatus for forming rabbeted corners and the like in ceramic blocks and the like, the apparatus including a cutting member movable from and to a stationary position, block guide means at one side of the cutting member and extending cross-wise thereof, and yielding means normally maintaining the cutting member at the stationary position.

3. Apparatus for forming rabbeted corners and the like in ceramic blocks and the like, the apparatus including a cutting member movable from and to a stationary position, block guide means at one side of the cutting member and extending cross-wise thereof, drive means for intermittently moving the cutting member from and to the stationary position, and yielding means normally maintaining the cutting member at the stationary position.

4. Apparatus for forming rabbeted corners and the like in ceramic blocks and the like, the apparatus including a cutting member movable from and to a stationary position, block guide means at one side of the cutting member and extending cross-wise thereof, and drive means for intermittently moving the cutting member from and to the stationary position, the drive means being actuated by a portion of a block moving past the cutting member, and yielding means normally maintaining the cutting member at the stationary position.

5. Apparatus for forming rabbeted corners and the like in ceramic blocks and the like, the apparatus including a cutting member movable from and to a stationary position, drive means for intermittently moving the cutting member from and to the stationary position, and yielding means normally maintaining the cutting member at the stationary position.

6. Apparatus for forming rabbeted corners and the like in ceramic blocks and the like, the apparatus including a cutting member movable from and to a stationary position, block guide means at one side of the cutting member and extending cross-wise thereof, drive means for moving the cutting member, and clutch means between the drive means and the cutting member.

7. Apparatus for forming rabbeted corners and the like in ceramic blocks and the like, the apparatus including a cutting member movable from and to a stationary position, block guide means at one side of the cutting member and extending cross-wise thereof, drive means for moving the cutting member, and clutch means between the drive means and the cutting member, the clutch means being actuated for engaging the drive means with the cutting member by a portion of a block moving past the cutting member.

8. Apparatus for forming rabbeted corners and the like in ceramic blocks and the like, the apparatus including a cutting member movable from and to a stationary position, block guide means at one side of the cutting member and extending cross-wise thereof, and means for moving a portion of a block past the cutting member.

9. Apparatus for forming rabbeted corners and the like in ceramic blocks and the like, the apparatus including a cutting member movable from and to a stationary position, block guide means at one side of the cutting member and extending cross-wise thereof, drive means for intermittently moving the cutting member from and to the stationary position, and means for moving a portion of a block past the cutting member.

10. Apparatus for forming rabbeted corners and the like in ceramic blocks and the like, the apparatus including a cutting member movable from and to a stationary position, block guide means at one side of the cutting member and extending cross-wise thereof, and drive means for intermittently moving the cutting member from and to the stationary position, the drive means being actuated by a portion of a block moving past the cutting member, and means for moving a portion of the block past the cutting member.

11. Apparatus for forming rabbeted corners and the like in ceramic blocks and the like, the apparatus including a cutting member movable from and to a stationary position, drive means for intermittently moving the cutting member from and to the stationary position, and means for moving a portion of a block past the cutting member.

12. Apparatus for forming rabbeted corners and the like in ceramic blocks and the like, the apparatus including a cutting member movable from and to a stationary position, block guide means at one side of the cutting member and extending cross-wise thereof, yielding means normally maintaining the cutting member at the stationary position, and means for moving a portion of a block past the cutting member.

13. Apparatus for forming rabbeted corners and the like in ceramic blocks and the like, the apparatus including a cutting member movable from and to a stationary position, block guide means at one side of the cutting member and extending cross-wise thereof, drive means for intermittently moving the cutting member from and to the stationary position, yielding means normally maintaining the cutting member at the stationary position, and means for moving a portion of a block past the cutting member.

14. Apparatus for forming rabbeted corners and the like in ceramic blocks and the like, the apparatus including a cutting member movable from and to a stationary position, block guide means at one side of the cutting member and extending cross-wise thereof, and drive means for intermittently moving the cutting member from and to the stationary position, the drive means being actuated by a portion of a block moving past the cutting member, yielding means normally maintaining the cutting member at the stationary position, and means for moving a portion of the block past the cutting member.

15. Apparatus for forming rabbeted corners and the like in ceramic blocks and the like, the apparatus including a cutting member movable from and to a stationary position, drive means for intermittently moving the cutting member from and to the stationary position, yielding means normally maintaining the cutting member at the stationary position, and means for moving a portion of a block past the cutting member.

16. Apparatus for forming rabbeted corners and the like in ceramic blocks and the like, the apparatus including a cutting member movable from and to a stationary position, block guide means at one side of the cutting member and extending cross-wise thereof, drive means for moving the cutting member, clutch means between the drive means and the cutting member, and means for moving a portion of a block past the cutting member.

17. Apparatus for forming rabbeted corners and the like in ceramic blocks and the like, the apparatus including a cutting member movable from and to a stationary position, block guide means at one side of the cutting member and extending cross-wise thereof, drive means for moving the cutting member, and clutch means between the drive means and the cutting member, the clutch means being actuated for engaging the drive means with the cutting member by a portion of a block moving past the cutting member, and means for moving a portion of the block past the cutting member.

18. The method of forming rabbeted corners and the like in ceramic blocks and the like by the use of a cutting member, which includes moving a portion of a block in one direction past the cutting member so that the cutting member severs a portion of the block, and then maintaining the block stationary and moving the cutting member through the block in another direction.

In testimony that we claim the above, we have hereunto subscribed our names.

CHARLES A. FRY.
CLARENCE HARSH.
RALPH M. SCHORY.